United States Patent
Lee et al.

(10) Patent No.: US 6,192,413 B1
(45) Date of Patent: Feb. 20, 2001

(54) METHOD AND SYSTEM FOR PROCESS QUEUE COMMUNICATIONS ROUTING

(75) Inventors: Dana R. Lee, Laurel; Richard J. Madrid; Suresh K. Gursahaney, both of Gaithersburg, all of MD (US)

(73) Assignee: International Business Machines Corporation, Armonk, NY (US)

( * ) Notice: Under 35 U.S.C. 154(b), the term of this patent shall be extended for 0 days.

(21) Appl. No.: 07/922,273

(22) Filed: Jul. 30, 1992

(51) Int. Cl.[7] .................................................. G06F 15/173
(52) U.S. Cl. ............................................. 709/238; 709/223
(58) Field of Search .................................... 395/800, 200, 395/325, 650; 370/60, 60.1; 364/284.3, 281.3; 709/223, 238

(56) References Cited

U.S. PATENT DOCUMENTS

| | | | |
|---|---|---|---|
| 3,989,900 | 11/1976 | Norwich | 379/50 |
| 4,320,256 | 3/1982 | Freeman | 379/73 |
| 4,406,925 | 9/1983 | Jordan et al. | 379/93 |
| 4,438,296 | 3/1984 | Smith | 379/69 |
| 4,451,700 | 5/1984 | Kempner et al. | 379/88 |
| 4,599,493 | 7/1986 | Cave | 379/247 |
| 4,742,511 | * 5/1988 | Johnson | 370/85.9 |
| 4,797,911 | 1/1989 | Szlam et al. | 379/67 |
| 4,870,571 | * 9/1989 | Frink | 395/200 |
| 4,894,857 | 1/1990 | Szlam et al. | 379/67 |
| 4,896,290 | * 1/1990 | Rhodes et al. | 364/DIG. 2 |
| 5,036,535 | 7/1991 | Gechter et al. | 379/210 |
| 5,084,816 | * 1/1992 | Boese et al. | 395/575 |
| 5,097,528 | 3/1992 | Gursahaney et al. | 379/67 |
| 5,119,370 | * 6/1992 | Terry | 370/60.1 |
| 5,218,676 | * 6/1993 | Ben-Ayed et al. | 395/200 |
| 5,245,705 | * 9/1993 | Swaney | 395/200 |
| 5,249,178 | * 9/1993 | Kurano et al. | 370/60 |
| 5,283,897 | * 2/1994 | Georgiadis et al. | 395/650 |
| 5,309,431 | * 5/1994 | Tominaga et al. | 370/60 |
| 5,335,347 | * 8/1994 | Foss et al. | 395/650 |

\* cited by examiner

Primary Examiner—John A. Follansbee
(74) Attorney, Agent, or Firm—John D. Flynn

(57) ABSTRACT

A method and system are disclosed for receiving messages at a communications node from a communications network, which are directed to selected process queues within the communications node. The method makes use of a router table stored in the communications node, to direct incoming messages to selected process queues. The method provides flexibility in changing the configuration of a node or the configuration of a network, without altering communications management software which manages the exchange of messages between a communications node and the network.

8 Claims, 12 Drawing Sheets

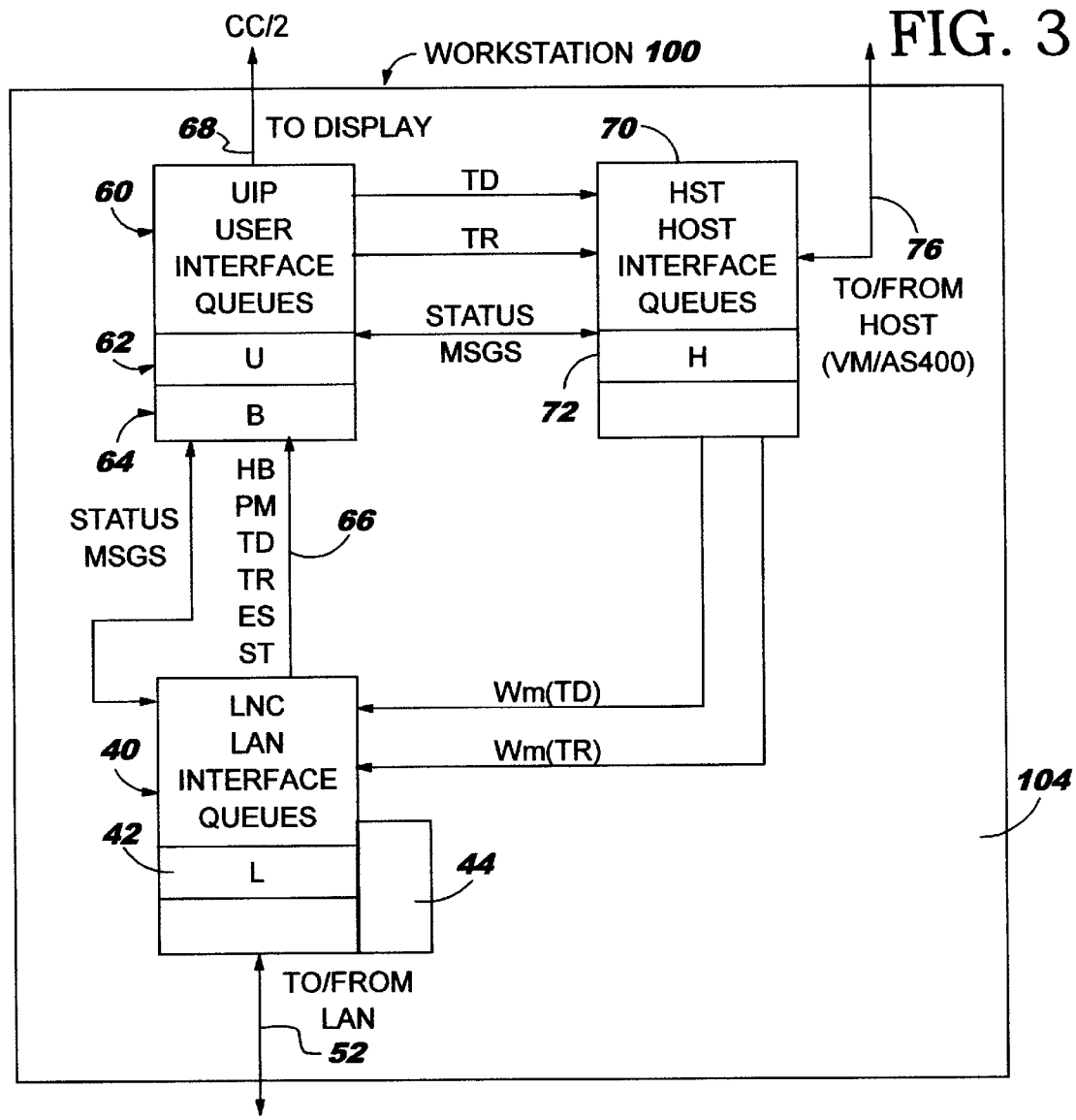

ROUTER TABLE

| HB | 12 | 8 | B |
| PM | 14 | 8 | U |
| TD | 16 | 8 | H |
| TR | 18 | 8 | U |
| WM |    |   |   |
| AS |    |   |   |
| ES | 23 | 8 | U |
| ST | 25 | 8 | U |

| 12 | 8 | B |
| 14 | 8 | U |
| 16 | 8 | H |
| 18 | 8 | U |
| 23 | 8 | U |
| 25 | 8 | U |

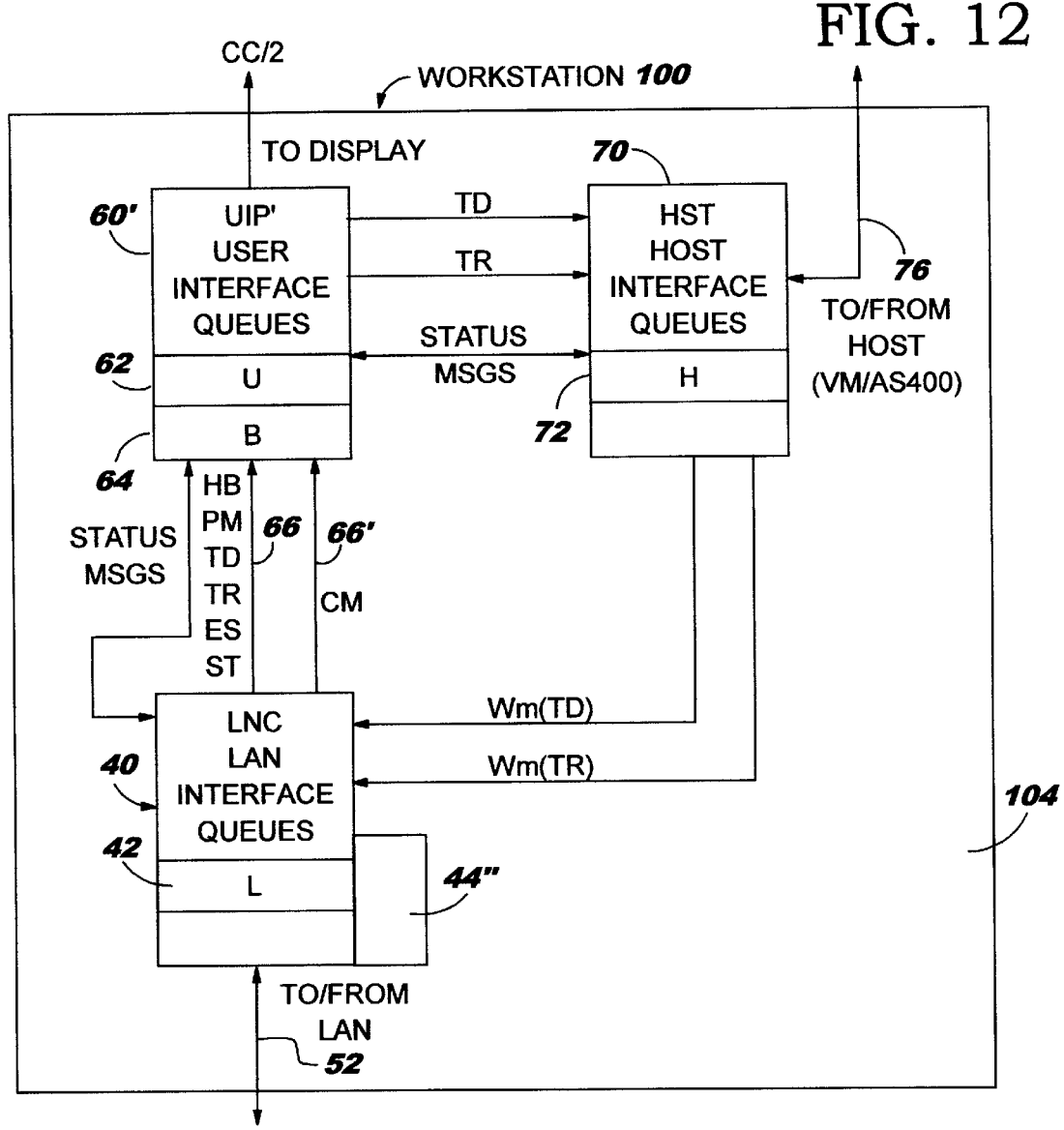

METHOD AND SYSTEM FOR PROCESS QUEUE COMMUNICATIONS ROUTING

RELATED PATENTS AND PATENT APPLICATIONS

The invention disclosed herein is related to U.S. Pat. No. 5,097,528 to S. K. Gursahaney, issued Mar. 17, 1992, entitled "System for Integrating Telephony Data With Data Processing Systems," which is assigned to the IBM Corporation and incorporated herein by reference.

Copending U. S. patent application Ser. No. 07/846,657 by S. K. Miller, et al. entitled "A System, Data Method and Program to Provide a Programmable Interface Between a Workstation and an Archive Server to Automatically Store Telephone Transaction Information," filed Mar. 5, 1992, assigned to the IBM Corporation and incorporated herein by reference.

Copending U. S. patent application Ser. No. 07/847,453 by R. J. Madrid, et al. entitled "Data Processing System, Method and Program for Constructing Host Access Tables for Integration of Telephony Data With Data Processing Systems," filed Mar. 6, 1992, assigned to the IBM Corporation and incorporated herein by reference.

BACKGROUND OF THE INVENTION

1. Technical Field

The invention disclosed broadly relates to data processing systems and more particularly relates to routing communications between computer processes in the same communications node.

2. Background Art

The copending U. S. patent application by S. K. Miller, et al. cited above, is directed to a computer-based telephone call placement and answering system. A local area network is described in the S. K. Miller, et al. patent application, which includes a plurality of workstations, a gateway server, an archive server, and other equipment used to distribute incoming telephone calls to a plurality of operators working at workstations connected to a local area network. The operators can also place outbound calls. The gateway server connected to the local area network will receive caller identity information for inbound calls and will initiate the accessing of a data base coupled to the local area network, so as to enable the operators working at the workstations to have caller-related data displayed to them at the time that their telephone rings with the inbound call. The gateway server interacts with a PBX (Public Branch Exchange) connected to the public telephone network.

The system described in the S. K. Miller, et al. patent application is typical of multiple node local area network embodiments, in that it requires a communications program to be resident at each communications node to interact with a local area network for sending and receiving messages between the nodes. Many of the nodes are functionally different from one another, for example the workstation nodes are functionally different from the gateway server node, the workstation nodes are functionally different from the archive server node, and other types of functions for nodes connected to the local area network can be postulated which are different from the workstation nodes. The usual embodiment in the prior art for the communications program interfacing a communications node with a local area network, requires that the communications program be customized in its source code to interact with the plurality of computer program processes running in the node which must carry out the unique function assigned to that node.

When the function assigned to a particular node in a local area network is to be changed, it is typical in the prior art that the communications program for that node must also be changed in order to properly communicate with the new or modified processes to be resident in the node. Further, where a different node having a new function is added to the local area network, it may be necessary to modify the communications program in each of the other nodes to enable the proper receipt and processing of messages from the newly added node.

OBJECTS OF THE INVENTION

It is therefore an object of the invention to provide an improved method for performing communications management in a communications node of a local area network.

It is another object of the invention to provide a more flexible means for managing communications between a communications node and a local area network.

It is still a further object of the invention to provide a easily programmed means to change the unique program functions performed in a communications node so as to make unnecessary the reprogramming of communications software in the communications node.

SUMMARY OF THE INVENTION

These and other objects, features and advantages are accomplished by the invention disclosed herein. An inter-process communications routing method and system are disclosed for receiving messages at a communications node from a local area network or other type of communications network. The messages are directed to selected process queues. The method includes the step of receiving at the communications node a message from the communications network. The message includes a message type designation and accompanying data. The method continues by searching a router table stored in the communications node. The search is performed by using the message type designation as a query term in the router table. The search is performed to get a process queue name for a process queue which is resident in the communications node. Once the process queue name has been obtained from the router table, the method continues by writing the data from the message into the named process queue.

The router table can include a plurality of message type designations and a corresponding plurality of process queue names. Typical message type designations can include a heartbeat message, a progress message, a transfer data message, a telephony request message, a workstation message, an archive server message, or an event status message. Other types of functions such as diverse telephony functions can also have their messages designated. Each of these corresponding message types can correspond to a particular communications or telephony function which is carried out at the communications node.

By providing the router table in each communications node to enable the mapping of diverse messages to selected computer programs and their corresponding process queues, flexibility is provided in the reconfiguration of an individual communications node. Flexibility is also provided in the reconfiguration of the overall local area network, without the necessity of changing the communications software which must support that communications in each node.

DESCRIPTION OF THE FIGURES

These and other objects, features and advantages will be more fully appreciated with reference to the accompanying figures.

FIG. 3 is a detailed memory diagram of the workstation 100 configured with a first router table 44.

FIG. 3A illustrates the router table 44 for the workstation 100 in FIG. 3.

FIG. 3B illustrates a more compact form of the router table 44.

FIG. 10A illustrates the router table 44B.

FIG. 10B illustrates a more compact form of the router table 44B.

FIG. 11 shows the transmission from the callback server 140 of a callback message (CM) to the workstation 100.

FIG. 12 is a memory diagram of the workstation 100, configured to receive callback messages (CM), using the router 44".

FIG. 12A illustrates the router table 44".

FIG. 12B illustrates a more compact form of the router table 44".

DISCUSSION OF THE PREFERRED EMBODIMENT

Figure 1:
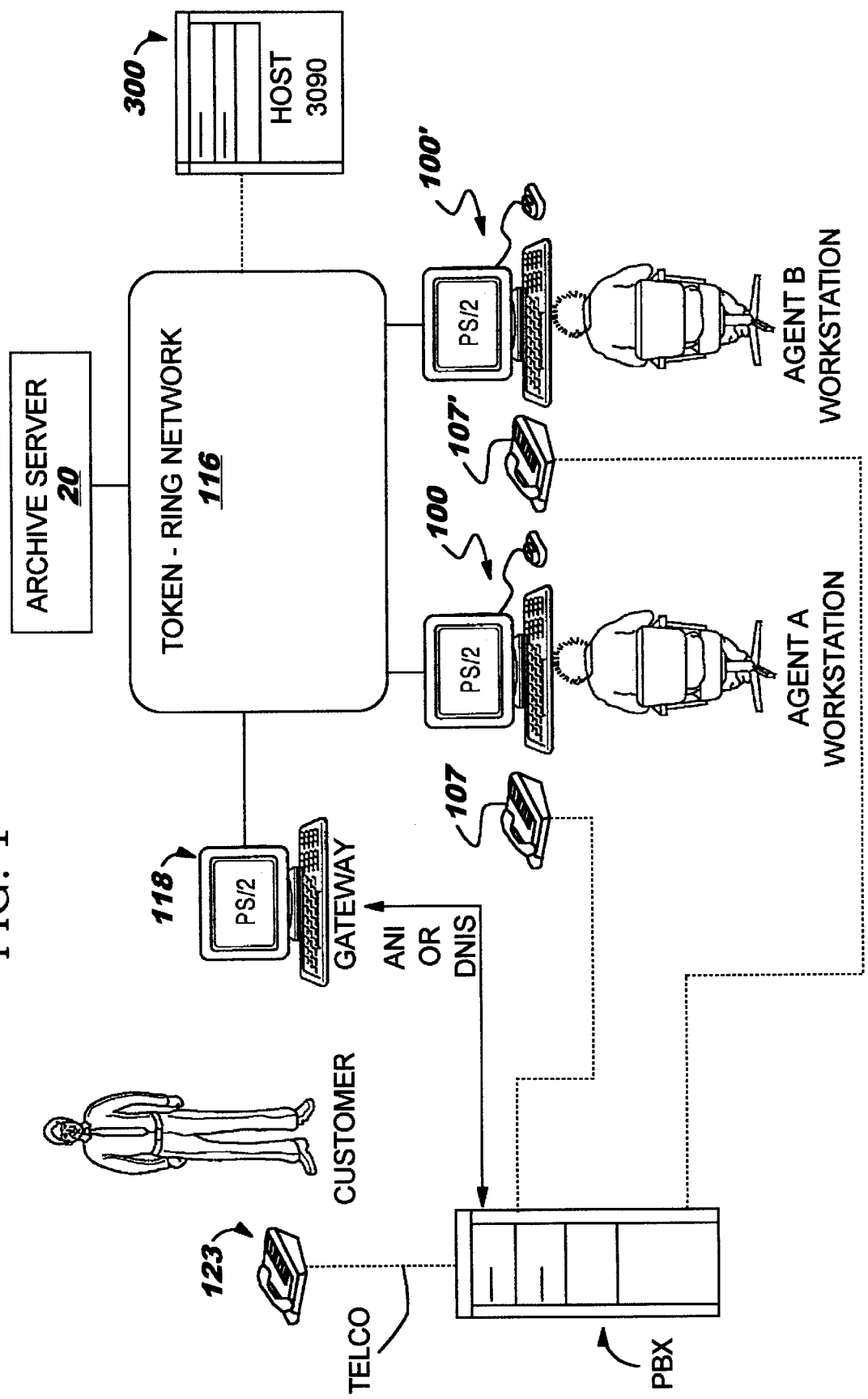
FIG. 1 is an overall architectural diagram of a local area network such as is disclosed in the copending S. K. Miller, et al. patent application.

The local area network 116 shown in FIG. 1 is described in greater detail in the copending U.S. patent application by S. K. Miller, et al. cited above, and incorporated herein by reference. The application of the local area network 116 is to a telephone support system wherein inbound telephone calls from telephone 123 are connected to one of a plurality of telephones 107 or 107' of answering operators sitting at workstations 100 or 100', respectively. The caller's identity is passed from the telephone network (TELCO), perhaps through a PBX, to a gateway server 118. The gateway server will also receive from the PBX the identity of the respective one telephone 107 or 107' which will be receiving the call. The gateway server will then pass the caller's identification to the corresponding workstation 100 or 100', respectively, of the answering operator. The workstation 100 will perform a data base access to a host computer 300 which is coupled to it, in order to obtain information relating to the calling party. Host computer 300 may either be connected to the LAN 116 as shown in FIG. 1, or it may be directly connected to the workstations 100 and 100'. The information thus accessed from the host computer is displayed at the workstation 100 at the time that the answering telephone 107 rings at the workstation. This is called inbound call processing.

Outbound call processing is also supported, wherein an operator at a workstation can access information related to a party to whom a call is to be placed. The information is accessed from the host computer 300 and is displayed on a display screen at the workstation 100. The operator can invoke a request to dial the telephone 123 of the party to be called. Data, including the telephone number of the party to be called, is transferred from the workstation 100 over the local area network 116 to the gateway server 118. The gateway server 118 will then deliver the telephone number of the party to be called, to the public branch exchange (PBX), thereby initiating the placement of the call.

An additional feature of the local area network 116, as is described in the S. K. Miller, et al. patent application, is the provision of an archive server 20. The archive server stores a data base of records having a plurality of category fields for information derived from each telephone transaction. Messages initiated from either the gateway server 118 or from a workstation 100 are directed to the archive server 20, to transmit data to be archived regarding telephone transactions which have been conducted.

The gateway server 118, the workstation 100, and the archive server 20, are embodied as IBM Personal System/2 Model 80 personal computers, for example. The workstation 100 and the gateway 118 and the archive server 20 use IBM System Application Architecture (SAA) in an Operating System/2 Extended Edition (OS/2 EE) environment. Operating System/2, OS/2, and System Application Architecture are trademarks of the International Business Machines Corporation. The OS/2 EE Communications Manager Token Ring LAN NETBIOS programming interface is used to provide communications between the gateway 118, the workstation 100 and the archive server 20. The gateway 118 also uses the OS/2 EE Communications Manager X.25 Application Programming Interface (API) for communications with a PBX which can be connected to the gateway server, as is shown in the S. K. Miller, et al. patent application.

The archive server 20 uses the OS/2 EE data base manager for maintaining the data base records. The data base manager is described in the IBM publication "OS/2 EE Users Guide," Vol. 3, Order No. O1F-0289, available from IBM branch offices.

Figure 2A:
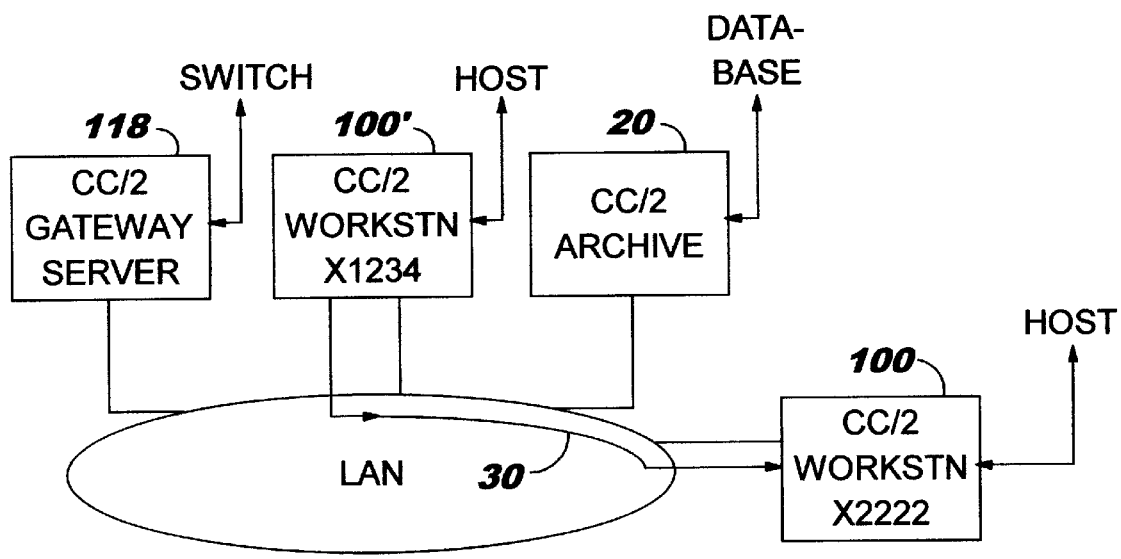
FIG. 2A is a diagram similar to that of FIG. 1, which shows the transmission of a transfer data (TD) message from a first workstation to a second workstation.
Figure 5:
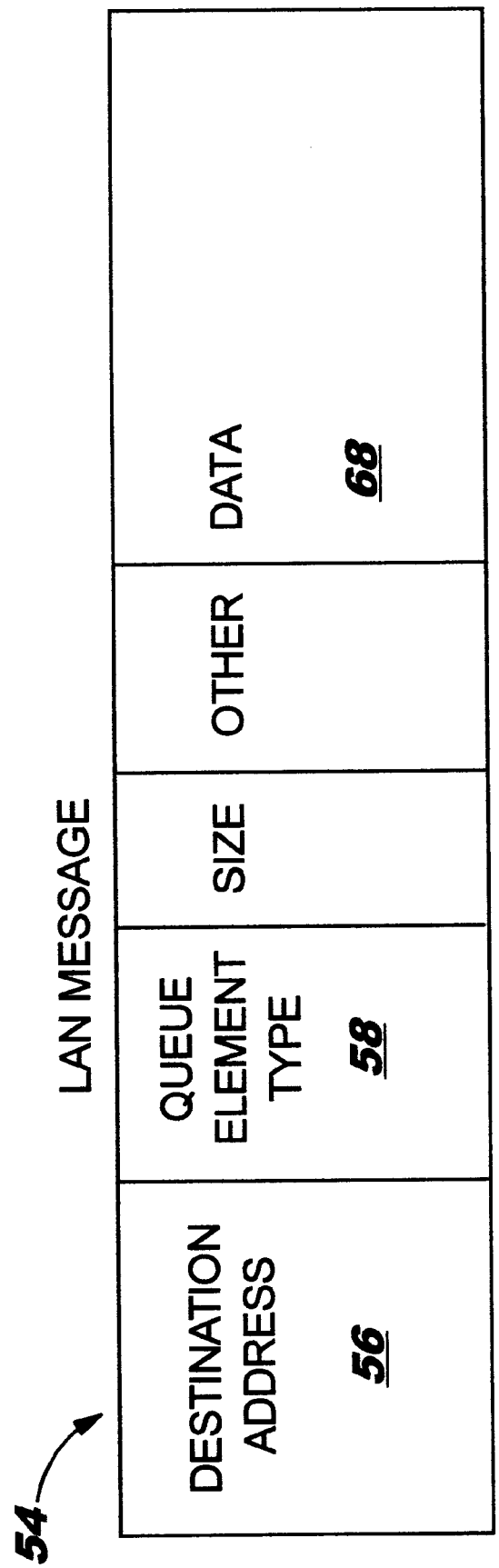
FIG. 5 is a format diagram of a local area network message, including a queue element-type designation, in accordance with the invention.

Reference is now made to FIG. 2A which depicts the local area network 116 of FIG. 1, and shows the transmission of a transfer data message (TD) from a first workstation 100' to a second workstation 100, the transfer being indicated by the arrow 30. The format of a LAN message such as the message designated by the arrow 30, is shown in FIG. 5. A transfer data message may contain data representing the contents of a screen currently being displayed at the workstation 100', which the operator at the workstation 100' wishes to transmit over the LAN 116 to the workstation 100. The LAN message 54 shown in FIG. 5 includes a destination address field 56 containing the destination address of workstation 100, and it also contains the queue element type 58. In accordance with the invention, the queue element type 58 is a designation of the message type corresponding to the program process in the workstation 100 which will be receiving the LAN message 54.

The data portion 68 of the LAN message 54 will include the data depicting the screen of the display at workstation 100', in this example. Other information such as the size of the data 68, and other control and data information can also be included in the LAN message 54.

Reference can now be made to FIG. 3 which shows the memory layout for the workstation 100. Reference should be made to the copending U.S. patent application by S. K. Miller, et al. for a more detailed description of the architecture of workstation 100. The memory 104 in workstation 100, which is depicted in FIG. 3, includes several computer programs 40, 60 and 70 which are necessary for the workstation to perform its assigned function.

The local area network communications program 40 performs the communications management function to enable the workstation 100 to exchange LAN messages 54 with the LAN 116. LAN messages 54 received from the LAN 116 over the path 52 are transferred to other programs 60 and 70 in memory 104, by making use of the router table 44, in accordance with the invention. The queue 42 associated with the LAN communications program 40 receives messages from other computer programs 60 and 70 in the memory 104.

The user interface program 60 in the memory 104, performs user interface functions such as formatting and presenting data for display over path 68 to a display device at the workstation 100. Queue ("U") 62, associated with the user interface program 60, receives a first category of messages from the local area network communications program 40. Queue ("B") 64 associated with user interface program 60, receives a second category of messages from the local area network communications program 40. The first category of messages transferred to queue 62 can be for example, process messages (PM), transfer data messages (TD), telephony request messages (TR), and event status message (ES). Other supported telephony functions (ST) can also be transferred using the queue 62. Queue 64 is allocated for heartbeat messages (HB) which are typically sent from a server in the LAN which must report its service status to other nodes in the network.

Another computer program in the memory 104 of the workstation 100 is the host interface program 70, which performs interaction functions between a workstation 100 and a host computer 300 coupled to the workstation 100. Typical connections and functions performed are described in the copending U.S. patent application to S. K. Miller, et al. and in the copending U. S. patent application to R. J. Madrid, et al., cited above. Associated with the host interface program 70 is the queue ("H") 72 which participates in message transfers between the host interface program 70 and the user interface program 60 and message transfers between the host interface program 70 and the local area network communications program 40. The host interface program 70 uses the path 76 to communicate between the workstation 100 and the host 300.

The local area network communications program 40, the user interface program 60, and the host interface program 70 in the memory 104 of FIG. 3, are concurrently running processes. Use is made of the interprocess communication function of the OS/2 Operating System to exchange messages between these programs. Reference can be made to the following IBM publication for a more detailed discussion of interprocess communication: "IBM OS/2 Programming Tools and Information—Programming Guide," Version 1.2, 1982, publication number 64F0273, available from IBM branch offices.

The receipt of a LAN message 54 from the LAN 116 by a communications node, makes use of the local area network communications program 40 in that respective receiving node. In accordance with the invention, the same common form for the local area network communications program 40 can be used for every communications node in the local area network 116, by making use of the router table 44.

Figure 4:
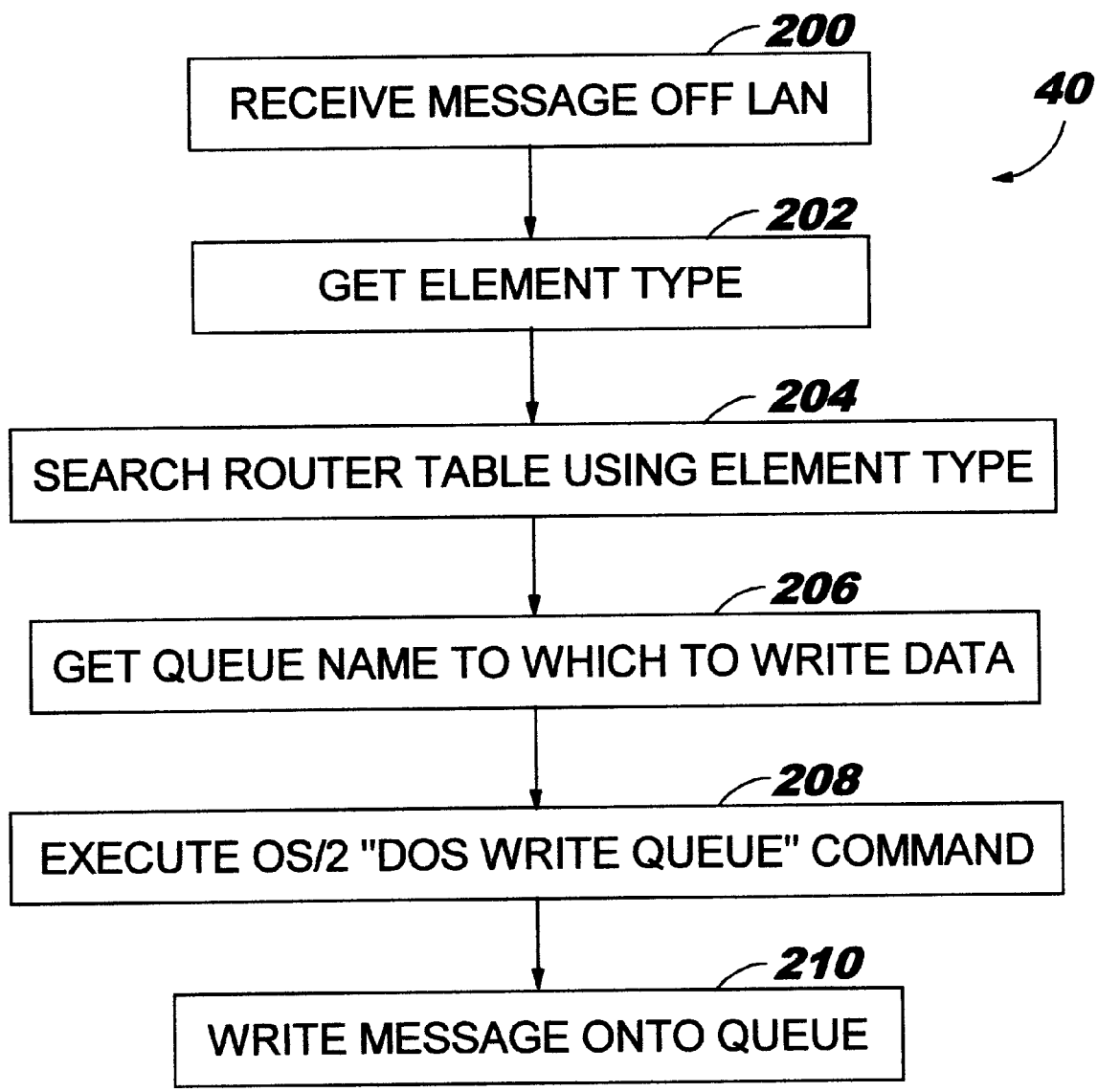
FIG. 4 is a flow diagram of a sequence of operational steps for the LAN communications program 40, in accordance with the invention.

In the example shown in FIG. 2A, the transfer data message (TD) sent over the path 30 from the workstation 100', will include a queue element type 58 which designates "TD." When the LAN message 54 is received over the path 52 at the workstation 100, the local area network communications program 40 invokes the sequence of operational steps shown in the flow diagram of FIG. 4.

Referring to the flow diagram of FIG. 4, step 200 receives the LAN message 54 from the LAN 116. Then step 202 gets the queue element type 58 from the LAN message 54. In this example, the queue element type is "TD."

Then in step 204, the router table 44 is searched using the queue element type 58 as the query term. FIG. 3A shows the router table 44. The router table 44 is organized with three fields, the first field 46 is the queue element type, the second field 48 is the element priority value, and the third field 50 is the queue identifier.

At the time that the workstation 100 is initialized to become a member of the local area network 116, the router table 44 is loaded into the memory 104 and associated with the local area network communications program 40. The router table 44 identifies the types of queue elements to which incoming messages 54 from the LAN 116 are to be directed. The queue element types are each associated with a respective computer program 60 or 70 residing in the memory 104. There can be multiple entries of the queue element type 46 in the router table 44, to enable a single message 54 to be broadcast to more than one receiving computer programs 60 and 70 in the memory 104.

In the flow diagram of FIG. 4, step 204 transitions to step 206 where the queue identifier 50 is obtained from the router table 44 for the corresponding queue element 46.

Then in step 208, a write operation is performed, writing the LAN message 54 to the queue which has been identified by the queue identifier 50. In the example of FIG. 2A, since the message type is a transfer data (TD) message, the router table 44 of FIG. 3A indicates that it is the "U" queue identifier which is the selected destination for the incoming message 54. The local area network communications program 40 then transfers the message 54 to the queue 62 which is the "U" queue, which is associated with the user interface program 60. Step 208 executes the OS/2 "DOS Write Queue" command to perform this operation. Then step 210 writes the message 54 onto the queue 62.

The element priority value 48 is used by the OS/2 Operating System to determine the order of accessing the LAN message 54 in the queue 62.

Reference to the above cited IBM publication "Operating System/2 Programming Tools and Information—Programming Guide," will explain this priority function in more detail.

Figure 2B:
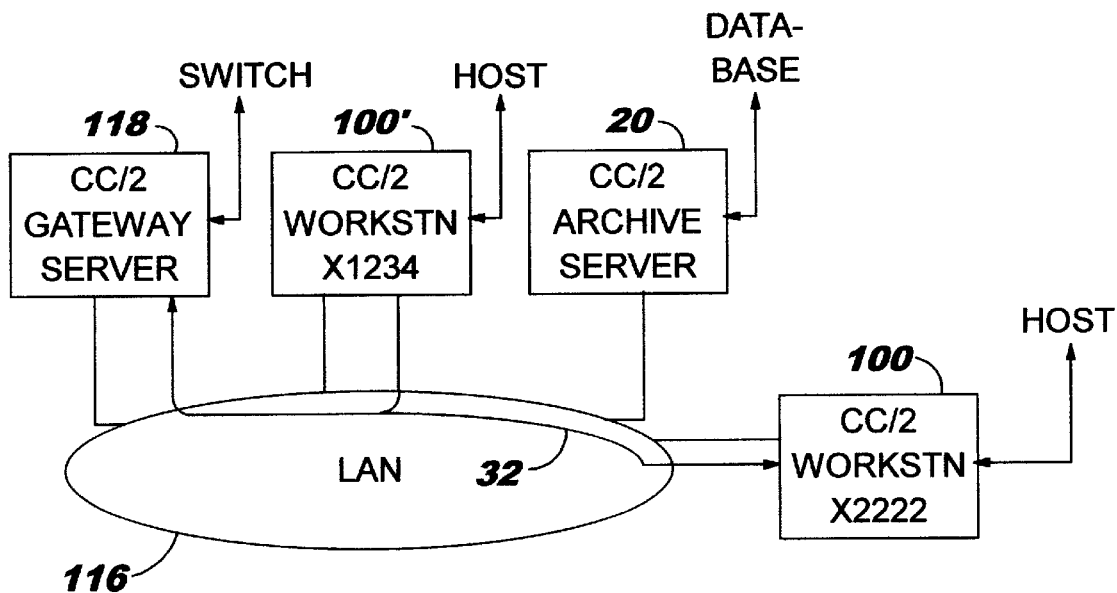
FIG. 2B is another illustration similar to that of FIG. 1, which shows the transmission of a heartbeat (HB) message from a gateway server to a workstation.

The power of the router table can be more fully appreciated by referring to FIG. 2B, wherein a second type of LAN message 54 is transmitted to the workstation 100. In FIG. 2B, the gateway server 118 functions to periodically broadcast over the local area network 116, a heartbeat message to the workstations in the network, indicating the health and availability of the gateway server 118. The heartbeat message (HB) is intended to go to a different queue in the workstation 100. When the heartbeat message (HB) passes over path 32 to the workstation 100 and is received over path 52 by the local area network communications program 40, step 202 of the flow diagram of FIG. 4 will get the element type 58. Since the element type 58 is "HB," step 204 searches the router table 44 and determines that the queue identifier 50 is "B," which is designation for the queue 64 in FIG. 3. Step 206 gets the queue name "B" and then steps 208 and 210 write the heartbeat data 68 from the LAN message 54 into the queue 64, which is associated with the user interface program 60. It can be seen that one can easily re-assign the destination for a particular message type to another queue or indeed, to another computer program within the memory 104, without requiring a re-programming of the source code for the local area network communications program 40. This advantage is offered by virtue of the use of the router table 44, as described above.

A more compact form of the router table 44 is shown in FIG. 3B, which removes the empty spaces corresponding to unused queue element types from the router table so as to provide a more compact form which is then stored in memory 104 and affiliated with the local area network communications program 40.

The router table 44 of FIG. 3A includes entries for the heartbeat message (HB), the progress message (PM), the transfer data message (TD), the telephony request message (TR), the event status message (ES), and the supported telephony functions message (ST). The heartbeat message (HB) is assigned by the-router table 44 to be transmitted to the queue 64. All of the other message types provided in the router table 44 of FIG. 3A, are intended for transmission to the queue 62.

Figures 6, 6A, 6B:
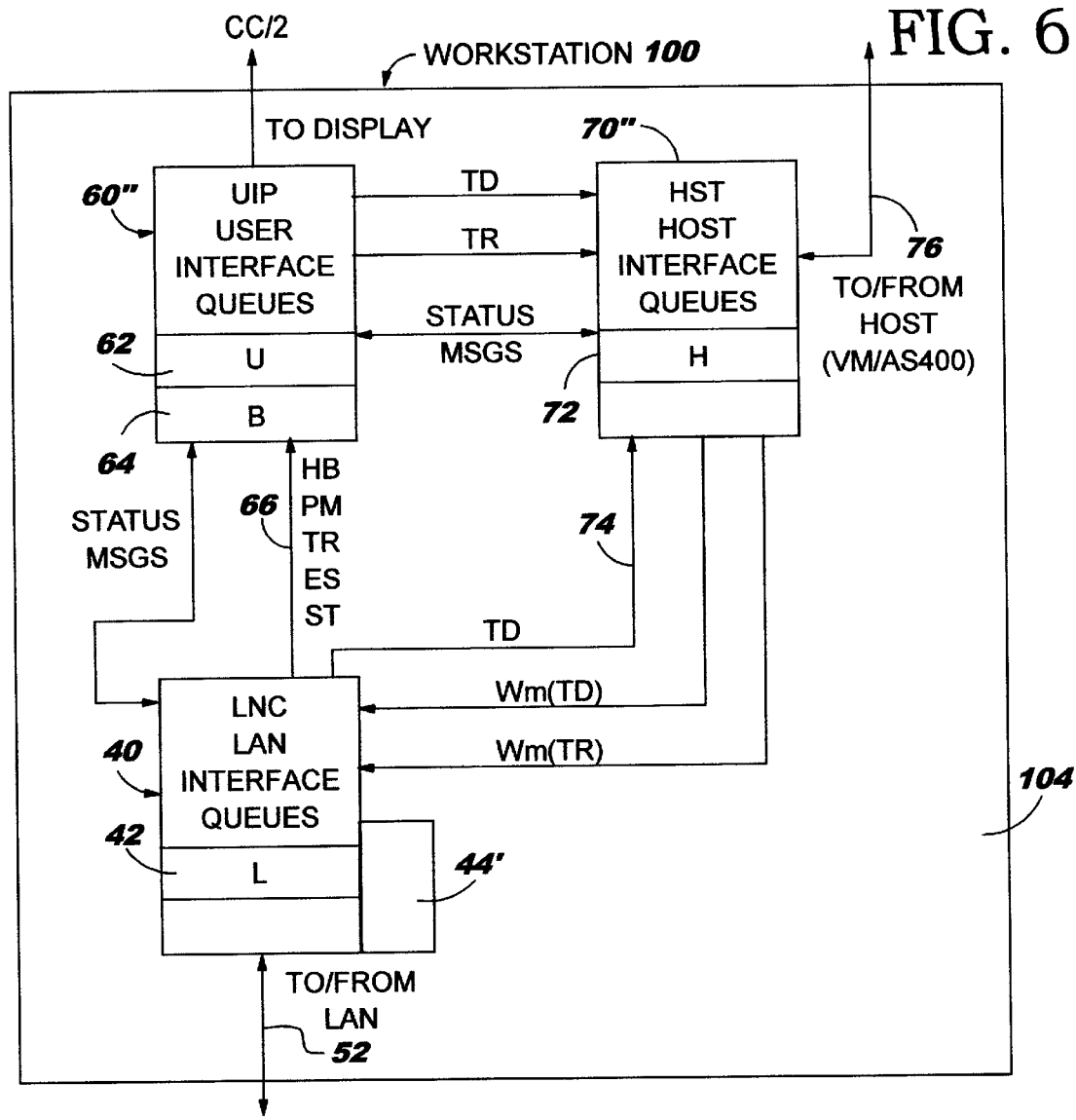
FIG. 6 is a memory diagram of the workstation 100 which has a different path TD from that shown in the workstation diagram of FIG. 3, using the router table 44'.
FIG. 6A illustrates the router table 44'.
FIG. 6B illustrates a more compact form of the router table 44'.

A further example of the power of the router table is shown in FIG. 6. FIG. 6 depicts the workstation 100 which was shown in FIG. 3, however a change has been made to the user interface program 60 and the host interface program 70. The user interface program 60" in FIG. 6 no longer is the assigned destination for transfer data (TD) message in this example. Instead, the host interface program 70" is now the assigned destination for "TD" messages over the path 74. In accordance with the invention, it is not necessary to re-program the local area network communications program 40 in order to accomplish this change. It is only necessary to provide a different router table 44' in FIG. 6A, which changes the queue identifier 50 for the "TD" entry, from the value of "U" which was in the router table 44 of FIG. 3A, to the new value of "H" which is in the router table 44' of FIG. 6A. Then, using the flow diagram for the local area network communications program 40 of FIG. 4, when step 204 searches the router table 44' using the "TD" element type, it gets the queue identifier value of "H," as intended. The local area network communications program 40 then executes steps 208 and 210 to write the LAN message 54 with its "TD" element type 58 to the queue 72 which is designated the "H" queue in FIG. 6. The queue 72 is affiliated with the host interface program 70". FIG. 6B shows a more compact representation of the router table 44'.

Figure 7:
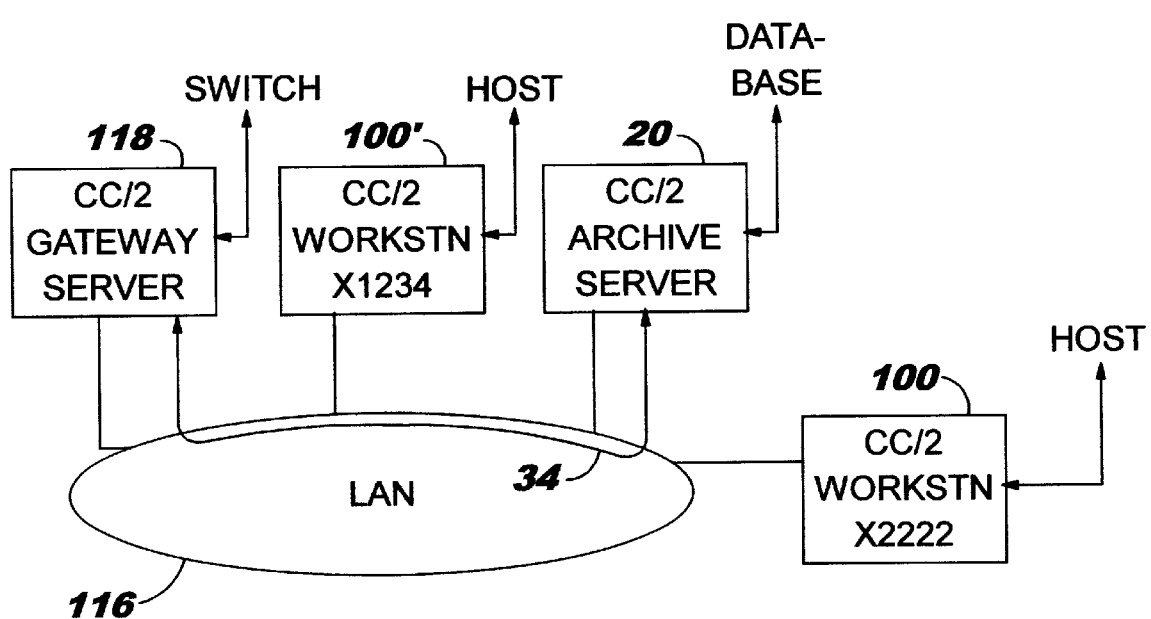
FIG. 7 is a diagram of the LAN of FIG. 1, showing the transmission of an archive message (AS) from the gateway server to the archive server.
Figure 8:
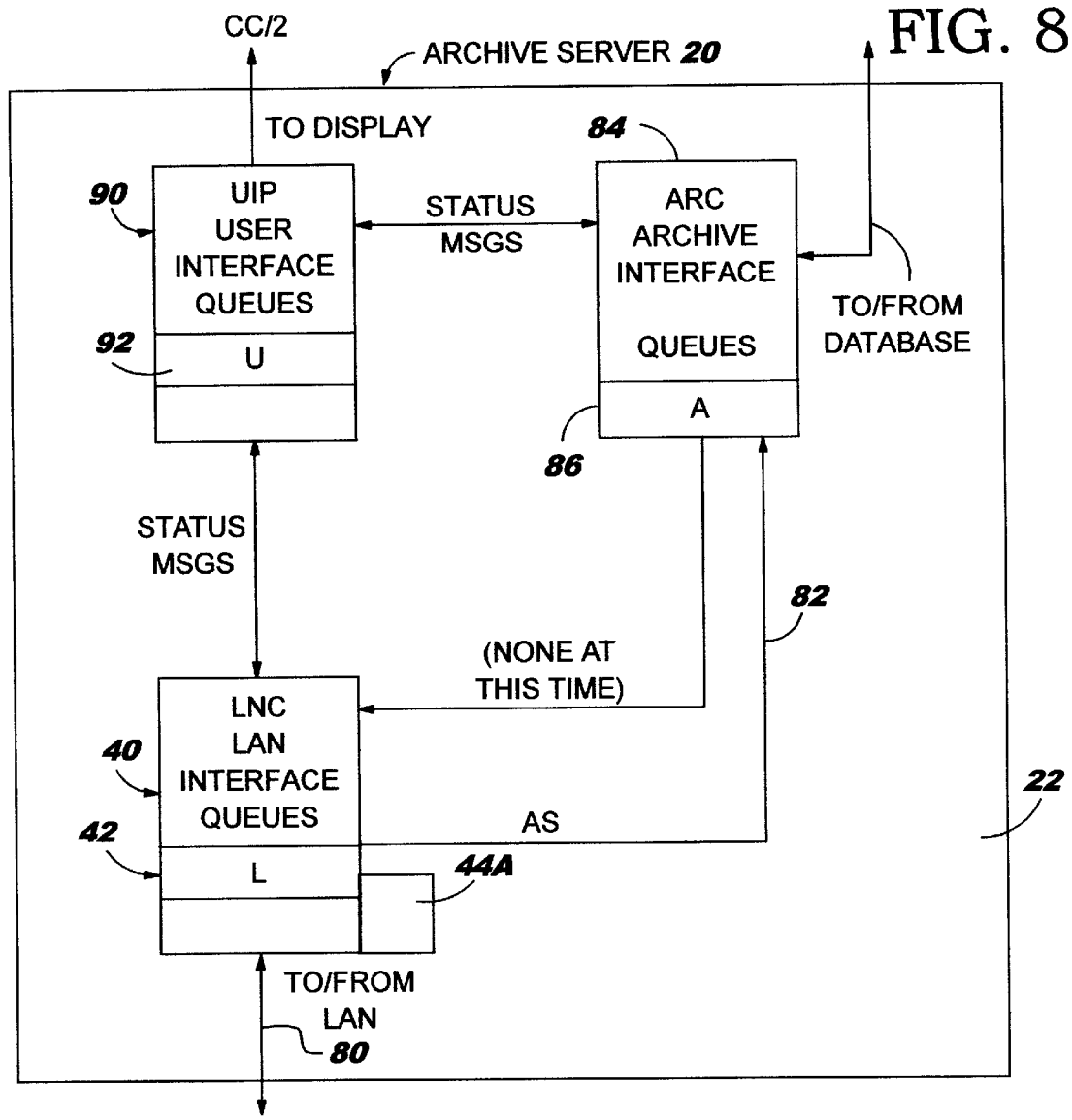
FIG. 8 is a diagram of the memory 22 in the archive server 20, configured with the router table 44A.

A further illustration of the power of the router table can be seen in FIGS. 7 and 8. FIG. 7 depicts the LAN 116 of FIG. 1, where an archive server message (AS) is transmitted from the gateway server 118 to the archive server 20, over the path 34.

The recipient of the "AS" message 54 is the archive server 20, whose memory organization is shown in FIG. 8. FIG. 8 shows the local area network communications program 40, which is the same form of the program which is found in the local area network communications program 40 of the workstation 100 in FIG. 3. In accordance with the invention, it is not necessary to change the source code for the program 40, in order to have it manage the communications functions for diverse nodes in the network. The router table 44A, which is associated with the LAN communications program 40 in the archive server 20 of FIG. 8, provides the customized routing necessary for the archive server 20.

The memory 22 of the archive server 20 also includes the user interface program 90 and its associated queue ("U") 92. Also included in the memory 22 is the archive interface program 84 and its associated queue ("A") 86.

When a message having the queue element type "AS" in field 58 of a LAN message 54, is received over path 80 of the archive server 20, the local area network communications program 40 invokes the sequence of operational steps in the flow diagram of FIG. 4. Step 200 receives the message 54 from the LAN 116. Step 202 gets the element type 58 from the LAN message 54, which in this example is "AS." Step 204 then searches the router table 44A, which is shown in greater detail in FIG. 8A.

Figure 8A:
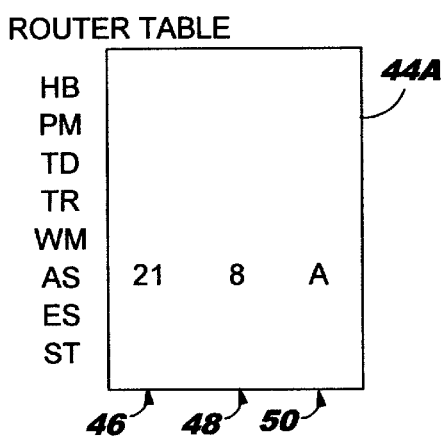
FIG. 8A illustrates the router table 44A.

In FIG. 8A, the router table 44A has a single entry which is the "AS" entry which identifies the queue element type as "AS" in field 46, it identifies the priority in field 48, and it identifies the queue identifier in field 50. Step 206 of FIG. 4 gets the queue name, which in this case is the queue identifier of "A" 50. Then step 208 and step 210 write the data portion 68 at the LAN message 54 over the path 82 to the queue "A" which is queue 86 of FIG. 8. Queue 86 of FIG. 8 is associated with the archive interface program 84.

Figure 8B:
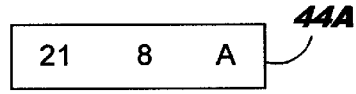
FIG. 8B illustrates a more compact form of the router table 44A.

Thus it can be seen that a diversity of communication nodes can have their diverse communication functions carried out by a single, common form of the local area network communications program 40, by means of using the router table, in accordance with the invention. FIG. 8B shows a more compact representation of the router table 44A.

Figure 9:
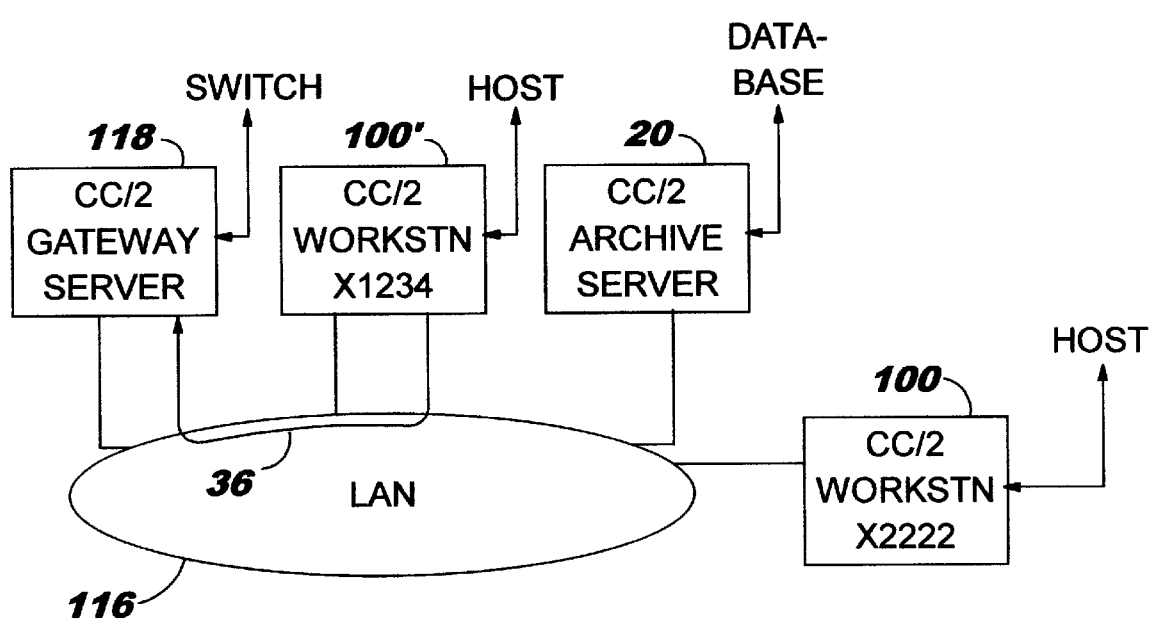
FIG. 9 illustrates the LAN of FIG. 1, wherein a telephony request (TR) message is transmitted from a workstation to the gateway server.
Figure 10:
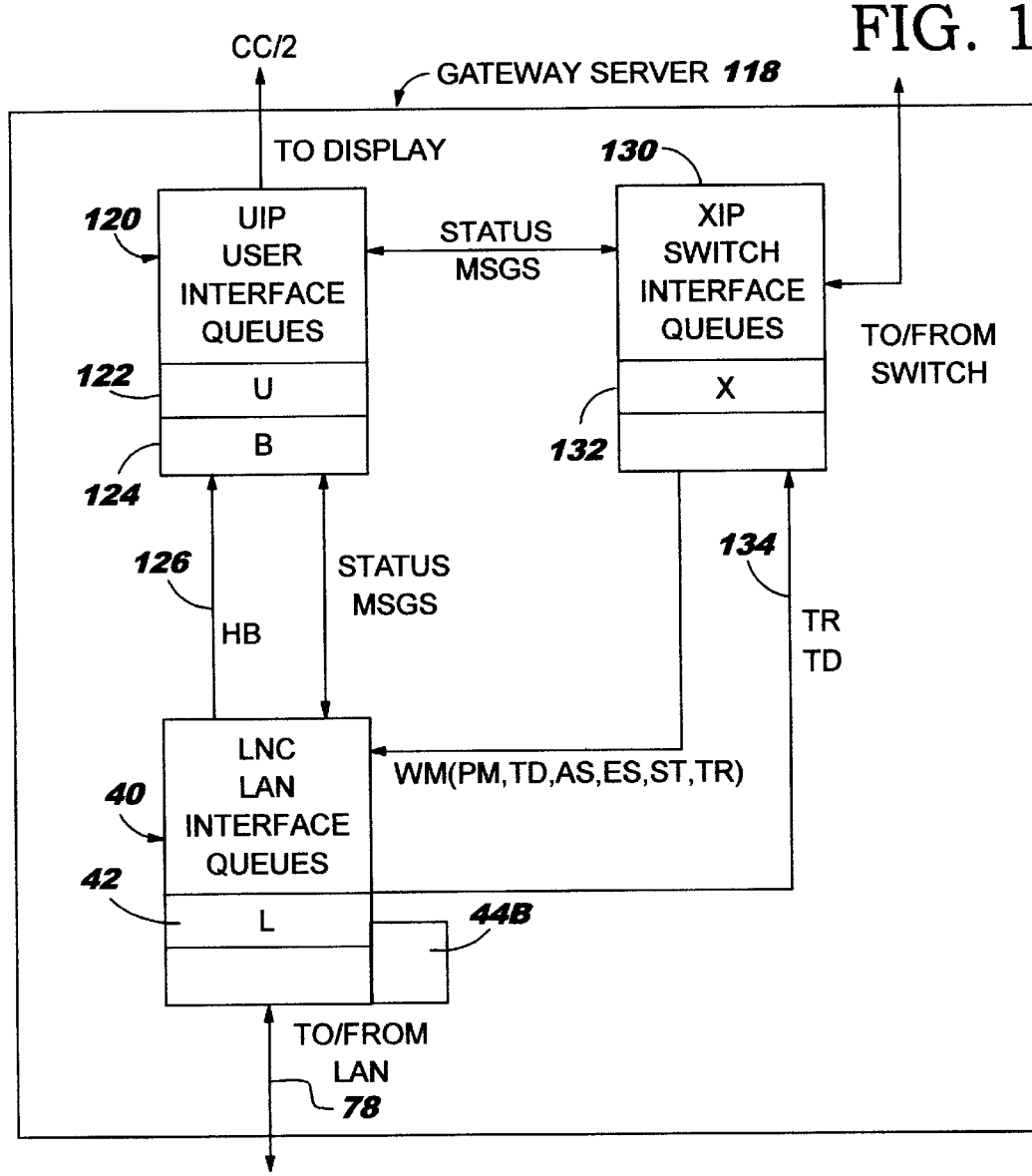
FIG. 10 is a diagram of the memory for the gateway server 118, configured using the router table 44B.

Another example illustrating the power of the router table is shown in FIGS. 9 and 10. FIG. 9 is an illustration of the LAN 116 as was shown in FIG. 1, with a new path 36 which transmits a LAN message 54 which has a telephony request message (TR) queue element type 58. The operator at the workstation 100' initiates a request to place a telephone call through the gateway server 118 to the PBX. The workstation 100' transmits over the LAN 116 the LAN message 54 with the queue element type 58 of "TR," and the data 68 which will include the telephone number of the party to be called. The LAN message 54 is transmitted over the path 36 to the gateway server 118.

The gateway server 118 has its memory organization shown in FIG. 10. The local area network communications program 40 in FIG. 10 receives over the path 78 from the LAN 116, the LAN message 54. The LAN communications program 40 of FIG. 10 executes the sequence of operational steps shown in the flow diagram of FIG. 4 to route the LAN message 54 over the path 134 to the switch interface program 130 and its associated queue ("X") 132.

Step 200 of FIG. 4 receives the LAN message 54 at the gateway server 118. Step 202 of FIG. 4 gets the element type from the queue element type field 58, which in this example is "TR."

Step 204 of FIG. 4 then searches the router table 44B of FIG. 10A, using the "TR" queue element type 58 as the query term. The router table 44B of FIG. 10A has three entries, the first entry is a heartbeat entry (HB), the second entry is a transfer data entry ("TD"), and a third entry is a telephony request entry ("TR").

The flow diagram of FIG. 4 has step 206 get the queue name for the "TR" entry which is "X" in the queue identifier field 50. As can be seen in FIG. 10A, the router table has the field 46 for the queue element, the field 48 for the element priority, and the field 50 for the queue identifier.

Then steps 208 and 210 of the flow diagram of FIG. 4 write the data portion to the "X" queue 132. Thus it is seen that the same, common form of the local area network communications program 40 is used in the gateway server 118 of FIG. 10, as was used in the archive server 20 of FIG. 8 and as was used in the workstation 100 of FIG. 3, in accordance with the invention. FIG. 10B shows a more compact form of the router table 44B.

The gateway server 118 may receive a heartbeat message (HB) over path 78 from the LAN 116, and the "HB" message would be directed by the router 44B over path 126 to the queue ("B") 124 which is affiliated with the user interface program 120, because the "HB" entry in the router table 44B has the queue identifier field 50 with the value of "B."

If a transfer data message "TD" is received over path 78 from the LAN 116 by the gateway server 118 of FIG. 10, then the router table will direct that message to the "X" queue 132, because the queue identifier field 50 of the router table 44B contains the value "X" for the "TD" entry.

Figure 11:
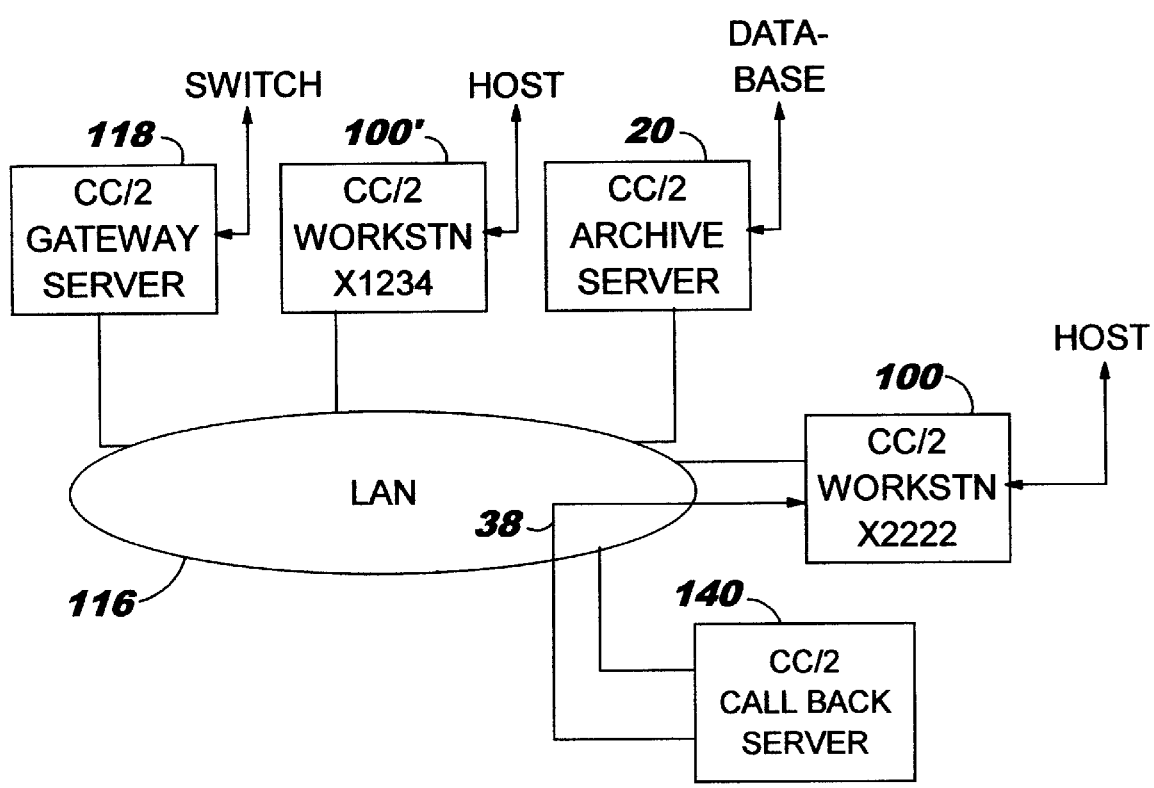
FIG. 11 illustrates the LAN of FIG. 1 wherein an additional communications node is added, which is the callback server 140.

Still a further illustration of the power of the router table are shown in FIGS. 11 and 12. FIG. 11 shows the local area network 116 shown in FIG. 1, with the addition of a new communications node, the callback server 140. It is the function of the callback server to receive messages from workstations in the network with information on a party to be called at a future time. The callback server will store this information until a designated event or designated timeout, at which time another outbound call will be placed.

FIG. 11 shows the callback server issuing a message over path 38 to the workstation 100, indicating that a party is to be called again. The callback server 140 will issue a LAN message 54 which contains a "CM" designation in the queue element type field 58.

FIG. 12 is a diagram of the workstation 100 memory organization, similar to that shown in FIG. 3. The difference in FIG. 12 is that the user interface program 60' has been changed to process the callback message "CM" received over path 38 from the callback server 140.

In accordance with the invention, it is not necessary to change the local area network communications program 40 in FIG. 12, from that in the workstation 100 shown in FIG. 3, in order to accommodate the additional new function of the callback server 140 in FIG. 11. It is only necessary to change the router table 44" shown in FIG. 12A.

The router table 44" in FIG. 12A, has an additional entry "CM," which has a queue element field 46, a priority field 48, and a queue identifier field 50. The queue identifier 50 for the "CM" entry has the value of "U," which will direct the "CM" LAN message 54 to the queue ("U") 62 associated with the user interface program 60'.

The message will be transferred over the path 66' as shown in FIG. 12. FIG. 12B shows a more compact form of the router table 44".

Thus it can be seen that the invention provides for an improved, more flexible, and adaptable means for managing the communications of a communications node in a communications network, without requiring the re-programming of the communications management program.

Although a specific embodiment of the invention has been disclosed, it will be understood by those having skill in the art that changes can be made to that specific embodiment without departing from the spirit and the scope of the invention.

What is claimed is:

1. A method of routing messages received from a communications network at a communications node to selected computer programs within the communications node, comprising the steps of:

receiving at said communications node, a message from said communications network addressed to said communication node, which includes a message type designation and data;

searching a router table stored at said communications node, using said message type designation as a query term, to get a process queue name for a process queue in said communications node, each process queue associated with a computer program in said communications node;

writing said data to said process queue having the process queue name;

processing said data by said computer program associated with said process queue.

2. The method of claim 1, wherein said router table includes a plurality of message type designations and a corresponding plurality of process queue names, each process queue name identifying a process queue in said communications node, each process queue associated with a computer program in said communication node for processing said data written to said process queue.

3. A method for receiving messages at a communications node from a communications network, which are directed to selected computer programs residing said communications node, comprising the steps of:

loading a router table into said communications node, for association with a communications control program therein;

said router table including at least one entry relating a message type to a process queue name, each process queue name identifying a process queue in said communications node, each process queue having an associated computer program;

receiving at said communications node, a message from said communications network, which includes a message type designation and data;

searching said router table stored at said communications node, using said message type designation from said message as a query term, to get said process queue name for a process queue in said communications node;

writing said data to said process queue, identified by said process queue name processing said data by said computer program associated with said process queue.

4. The method of claim 3, wherein said router table includes a plurality of message type designations and a corresponding plurality of process queue names, each process queue name identifying a process queue in said communications node, each process queue associated with a computer program in said communication node for processing said data written to said process queue.

5. A communications network including a plurality of communications nodes, with at least two of said communications nodes each comprising:

a communications management program for receiving messages from said communications network;

a router table for using a message type designation in messages received from said communications network, said message type designation being used as a query term for accessing said router table, to get a process queue name;

a plurality of process queues each process queue having a process queue name, each process queue associated with a computer program;

said router table directing said message received from said communications network to said process queue for processing by the computer program associated with said process queue.

6. A communications network including at least two communications nodes, comprising:

a first copy of a communications management program at a first communications node, for receiving messages from said communications network;

a first router table at said first communications node, for using a message type designation in messages received from said communication network, said message type designation being used as a query term for accessing said first router table, to get a first process queue name;

said first router table having a first entry relating a first message type to a first process queue name and having a second entry relating a second message type to a second process queue name;

a first process queue in said first communications node having said first process queue name;

a first computer program in said first communication node associated with said first process queue for processing of messages of said first type;

a second process queue in said first communications node having said second process queue name;

a second computer program in said first communications node associated with said second process queue for processing of messages of said second type;

said first router table directing a first message received from said communications network designating said first message type, to said first process queue for processing by said first computer program;

said first router table directing a second message received from said communications network designating said second message type, to said second process queue for processing by said second computer program.

7. The communications network of claim 6, which further comprises:

a second copy of said communications management program at a second communications node, for receiving messages from said communications network;

a second router table at said second communications node, for using a message type designation in messages received from said communications network, said message type designation being used as a query term for accessing said second router table, to get a process queue name;

said second router table having an entry relating a third message type to a third process queue name;

a third process queue in said second communications node having said third process queue name;

a third computer program in said second communications node associated with said third process queue for processing of messages of said third type;

said second router table directing a third message received from said network designating said third message type, to said third process queue for processing by said third computer program.

8. An article of manufacture for use in a communications node connected to a communications network, said article of manufacture comprising a computer useable medium having a computer readable program embodied in said medium, wherein the computer readable program when executed on the communications node causes the communications node to;

receive a message having a message type designation and data;

search a router table using said message type designation as a query term, to obtain a process queue name for a process queue, each process queue associated with a separate computer program; and write said data to said process queue having the obtained process queue name such that said separate computer program associated with said process queue processes said data.

* * * * *